United States Patent [19]

Sasse

[11] 3,818,088

[45] June 18, 1974

[54] SELF-REGULATING ACID CIRCULATION IN THE CONTACT PROCESS

[75] Inventor: Joachim Sasse, Junkersdorf, Germany

[73] Assignee: Chemiebau, Dr. A. Zieren GmbH & Co., KG, Koln, Germany

[22] Filed: Apr. 19, 1971

[21] Appl. No.: 135,016

[30] Foreign Application Priority Data
Apr. 18, 1970   Germany............................ 2018761

[52] U.S. Cl.................................. 423/522, 23/261
[51] Int. Cl............................................ C01b 17/80
[58] Field of Search....... 23/167, 168, 261; 423/522

[56] References Cited
UNITED STATES PATENTS

| | | | |
|---|---|---|---|
| 1,764,309 | 6/1930 | Howard............................... | 23/167 |
| 2,466,767 | 4/1949 | Herrmann et al..................... | 23/167 |
| 2,819,947 | 1/1958 | Stahl.................................... | 23/167 |
| 3,525,586 | 8/1970 | Drechsel et al....................... | 23/168 |

Primary Examiner—Oscar R. Vertiz
Assistant Examiner—J. Cooper
Attorney, Agent, or Firm—Millen, Raptes & White

[57] ABSTRACT

In the double absorption contact process for the production of sulfuric acid, the sump of the air drying tower and/or sulfur dioxide drying tower is connected in cascade series flow with the sump of the intermediate absorber tower which in turn is connected with the sump of the final absorber tower. The connection between the towers is effected by overflow pipes having at least one leg sealed by liquid thereby preventing any mixing of the gases in the various towers. The flow of the acid between the towers is substantially self-regulating and requires no pumps.

13 Claims, 1 Drawing Figure

PATENTED JUN 18 1974 3,818,088
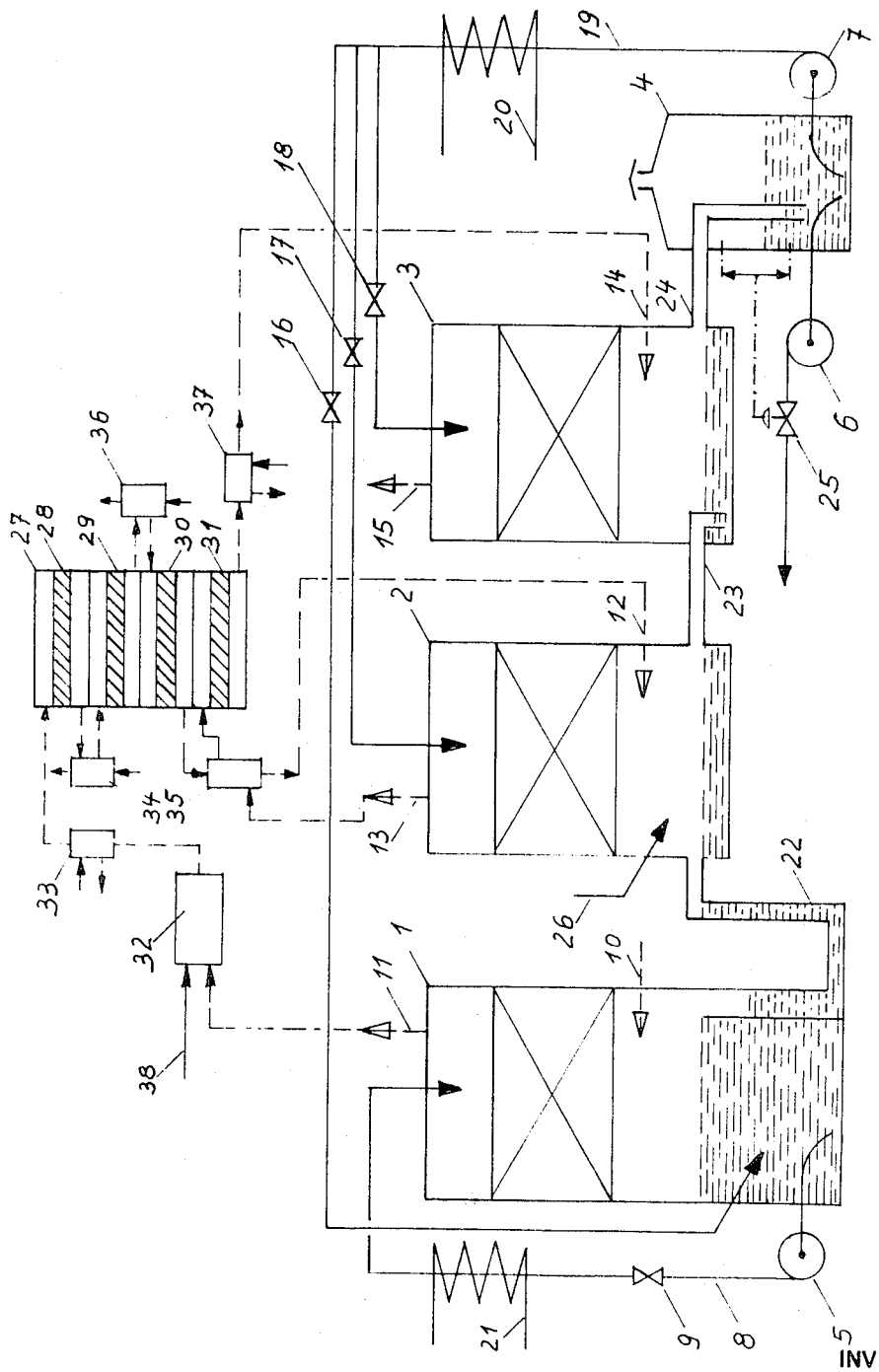
INVENTOR
JOACHIM SASSE
Millen, Raptes & White
ATTORNEYS

SELF-REGULATING ACID CIRCULATION IN THE CONTACT PROCESS

BACKGROUND OF THE INVENTION

This invention relates to the contact process for the preparation of sulfuric acid, and in particular to an improvement in the double absorption method wherein at least one process gas is subjected to a drying step.

In the preparation of sulfuric acid by the contact process, it is necessary to scrub several different gases with concentrated sulfuric acid to remove water vapor or sulfur trioxide. For example, in a system wherein an $SO_2$-containing gas is produced by the burning of pyrites, the gas is dried with concentrated sulfuric acid prior to entering the catalytic reactor. Incoming air, likewise, must be dried if it is to be used for the burning of sulfur or for the oxidation of $SO_2$ to $SO_3$ in the catalytic reactor. Such gas-drying processes are conducted in drying towers employing downwardly trickling sulfuric acid.

In a similar manner, to remove the sulfur trioxide from the gases formed in the catalytic reactor, the gases are scrubbed with concentrated sulfuric acid, during which procedure the sulfur trioxide is absorbed by the sulfuric acid. To attain the highest possible total conversion of $SO_2$ to $SO_3$ and to mitigate air pollution, increasing use is made of the double-absorption process wherein the $SO_2$ and $SO_3$-containing reaction gas is subjected to an intermediate absorption step with the effluent gas being recycled to the catalytic reactor to form more $SO_3$, and with the resultant gas being treated in a final absorber.

It has been conventional heretofore to operate scrubbing towers in sulfuric acid plants in an interrelated manner so that the acid produced in one of the towers is employed as the absorbing fluid in another tower. For example, in Belgian Pat. No. 639,993, there is disclosed the production of sulfuric acid by the double-absorption technique wherein sulfuric acid flows freely from the intermediate absorption step to the final absorption step, but wherein pumps are required to deliver acid from the final absorption step, to the gas drying step, and from the latter step to the intermediate absorption step. To ensure undisrupted operation, the towers must be provided with liquid level controls. Moreover, the sulfuric acid concentration in the towers must also be controlled so that the acid transfer from the final absorption step to the gas drying step and from the latter to the intermediate absorption step can be adjusted correctly. The expense of the associated instrumentation and control units is considerable and continuous maintenance of these units is necessary.

SUMMARY OF THE INVENTION

An object of the present invention is to improve, especially to simplify the operation and control of the drying and absorption steps of the sulfuric acid double-absorption process.

Another object is to lower the investment cost of the double absorption process without sacrificing operational reliability. Upon further study of the specification and appended claims, other objects and advantages will become apparent.

The above objects are attained by providing that the sulfuric acid from the gas drying step, the sulfuric acid from the intermediate absorption step and the sulfuric acid from the final absorption step can flow freely into a collecting tank which is optionally the sump of the final absorber. Through essentially gravity cascade flow from step to step pumps and liquid level controls become unnecessary. At the same time, provision is made to prevent any mixing of gases between towers.

In accordance with the preferred embodiment of the invention, the sulfuric acid can flow from the gas drying step successively through the intermediate absorption step and the final absorption step into the collecting tank. This type of cascade flow in series results in a self-regulating flow of sulfuric acid from the drying step to the collecting tank whereby the sulfuric acid concentration from step to step is somewhat increased. For example, in the gas drying step it is 96 percent, in the intermediate absorption step it is about 98.1 percent to 98.5 percent, preferably about 98.1 percent and in the final absorption step it is about 98.1 to 98.5 percent, preferably about 98.3 percent.

The design of the liquid closings between the steps corresponds to the gas pressures to be expected in the steps. The flow of acid results from the increase of acid level in towers due to the acid volume additionally formed in the respective steps.

The pressure conditions in the towers are such that the liquid cascades from the drying tower to the intermediate absorber, to the final absorber to the collecting tank. For example, the absolute pressure in the drying tower is usually about 0.9 to 1.3 atmospheres, in the intermediate absorber about 1.0 to 1.2 atmospheres, in the final absorber about 1.0 to 1.05 atmospheres, and in the collecting tank about 0.95 to 1.05 atmospheres. Similarly, the pressure difference is about 0.05 to 0.25 atmospheres between the drying tower and intermediate absorber, about 0.02 to 0.1 atmospheres between the intermediate absorber and the final absorber and about 0.0 to 0.02 atmospheres between the final absorber and the collecting tank.

Suitably, the requisite quantity of water is added in the intermediate absorption step for the formation of sulfuric acid from $SO_3$. Accordingly, by the time the concentrated acid reaches the collecting tank, the acid is mixed sufficiently to assure a uniform concentration.

The sulfuric acid can also flow from the gas drying stage through the intermediate absorption stage into the final absorpstage where it can be collected in the sump of the final absorption tower. In such a case, the sump of the final absorption tower must be designed large enough to act as a hold up reservoir or tank.

In accordance with the preferred embodiment of the invention, the sulfuric acid is cooled during its passage between the drying and absorption stages. In this way, the acid temperature in the sump of the absorption tower does not become excessive; i.e., it remains below 100°, preferably below 70°C in the absorption towers. In another embodiment, the sulfuric acid is subjected to supplemental cooling in the sump of the gas drying step and/or the absorption step before it is passed to the collecting tank. Here again a large increase in the temperature of the acid in the steps is avoided. Moreover, both absorption towers are preferably charged from the collecting tank with cooled sulfuric acid, the acid having been cooled either in the tank or downstream thereof in a separate heat exchanger. Separate acid lines from the collecting tank can be used, or alternatively there can be used a common line having branch lines for each absorption stage.

The apparatus required for conducting the process of this invention comprises, in essence, at least one scrubbing tower wherein $H_2SO_4$ is employed for air- or gas-drying, a multistage catalytic reactor with associated heat exchangers, a regulatable intermediate absorption tower disposed before at least the last catalytic contact stage, and a final absorption tower. This apparatus is improved according to this invention by providing that the sumps of the air- and/or gas-drying are connected with the intermediate absorption tower by overflow pipes having at least one liquid-sealed leg, hereinafter called "immersed overflow pipes". The sump of the intermediate absorption tower and that of the final absorption tower are also connected by immersed overflow pipes with a collecting tank for sulfuric acid. The immersed overflow pipes communicating the towers determine and regulate the liquid level of acid in the towers and also separate the gases in the towers from one another. Other equivalent connections between the towers can be used instead of the immersed overflow pipes which allow the acid to flow freely from tower to tower, but which prevent mixing of the gases between the towers. For example, it is possible to design the towers with a common wall so that the gas volume would be separated by only one side extending into the acid level. It is preferred, however, that the sumps of the intermediate absorption tower, of the final absorption tower and the collecting tank be connected by the immersed overflow pipes.

Instead of employing a separate collecting tank, the sump of the final absorption tower can be designed to have sufficient capacity to act as the collecting tank for the acid product.

To achieve good mixing of water with the process sulfuric acid used as $SO_3$ absorbent, an incoming conduit for water is advantageously associated with the intermediate absorption tower.

Temperature control in the towers can be achieved by using the immersed overflow pipes as acid coolers, heat exchanged against ambient air or a cooling fluid.

BRIEF DESCRIPTION OF DRAWING

The attached drawing is a schematic illustration of the preferred embodiment of this invention.

DETAILED DESCRIPTION OF PREFERRED EMBODIMENT

The drawing depicts a double absorption system comprising: a tower 1 for drying air, a tower 2 for intermediate absorption and a tower 3 for final absorption of $SO_3$-containing gases. The remaining parts of the system such as the catalytic reactor, the heat exchanger, etc., are illustrated in smaller scale to facilitate comprehension.

The air drying tower 1 and the intermediate absorption tower 2 are connected by a U-shaped flow pipe 22. A part of this pipe is provided by an acid overflow weir in the sump of the air drying tower 1. Because of the extent of the liquid seal, if there is a momentary drop in the gas pressure in tower 1, causing a sudden momentary reversal of acid movement through flow pipe 22, the effect will not draw gases from the intermediate absorption tower 2 into the drying tower 1. The absorption tower 2 is connected with the absorption tower 3 through an immersed overflow pipe 23 and the absorption tower 3 is connected with the collecting tank 4 by an immersed overflow pipe 24.

Dry air is passed, via conduit 10, into the air drying tower 1 and withdrawn via conduit 11. The dried air is used for oxidizing sulfur in combustion furnace 32 which is fed with liquid sulfur via conduit 38. The $SO_2$-containing combustion gases are cooled in waste-heat boiler 33 to the required temperature for catalytic oxidation and is introduced into catalytic reactor 27. The $SO_3$-containing gas after passing through several contacts (28, 29, 30) and cooling stages (34, 36 and 35) is withdrawn from the latter and passed through conduit 12 into the intermediate absorption tower 2 where water is added via conduit 26. The scrubbed gas is withdrawn through conduit 13, heated in the heat exchanger 35, passed through the last catalytic contact stage 31 of the catalytic reactor 27, cooled in heat exchanger 37 and passed via conduit 14 into final absorption tower 3 in which the remaining sulfur trioxide in the gas is removed. The resultant scrubbed gas is withdrawn via conduit 15, passed through a mist eliminator (not shown), then out to the atmosphere.

Sulfuric acid is delivered by pump 7 from the storage tank 4 via conduit 19 through cooler 20 to the three towers 1, 2 and 3. The amount admitted into towers 1, 2 and 3 can be regulated by three valves 16, 17 and 18. The air drying tower 1 is provided with an acid circulation system consisting of the pump 5, recycle conduit 8, the valve 9 and the cooler 21.

The acid level in towers 1, 2 and 3 is independent of the variable gas pressures in the towers by the virtue of the partition in the sump of tower 1, and the placement of flow pipes 23 and 24. The collecting tank 4 is provided with a pump 6, and liquid level regulator controlling valve 25, the latter being disposed in the pipe used for withdrawing acid product.

A self-regulating flow of sulfuric acid from the air drying tower 1 to the collecting tank 4 results from the present invention. Thereby, there is obtained a considerable savings in investment costs by eliminating the need for liquid level controls, and/or recycle systems and/or $H_2SO_4$ concentration analyzers in scrubbing towers 1, 2 and 3.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a contact double absorption process for the preparation of sulfuric acid which includes at least one gas drying stage employing concentrated sulfuric acid and wherein an $SO_2$ and $SO_3$-containing reaction gas is subjected to an intermediate gas absorption stage with absorbed effluent gas being recycled to a catalytic reactor to form additional $SO_3$ and the resultant gas treated in a final gas absorption stage, the improvement which comprises:

a. passing concentrated sulfuric acid by gravity flow from the sump of said gas drying stage into the sump of said intermediate gas absorption stage while preventing admixture of gases between said stages by forming a liquid seal therebetween sufficient to prevent gases from the intermediate absorption tower from being drawn into said drying tower during a momentary drop of gas pressure in the drying tower causing a momentary reversal of acid flow between said sumps; and b. passing concentrated sulfuric acid by gravity flow from the sump of said intermediate gas absorption stage into a collecting tank while preventing admixture of gases between said sump and said tank by forming a liquid seal therebetween.

2. A process according to claim 1 further comprising passing concentrated sulfuric acid by gravity flow from the sump of said final gas absorption stage into a collecting tank while preventing admixture of gases between said sump and said tank by forming a liquid seal therebetween.

3. A process according to claim 2 wherein the sulfuric acid is passed successively through the intermediate absorption stage and the final absorption stage into the collecting tank.

4. A process according to claim 1 wherein the sulfuric acid from the gas drying step is passed through the intermediate absorption stage and is collected in the sump of the final absorption stage.

5. A process according to claim 1 wherein water is fed into the intermediate absorption stage for acid production.

6. A process according to claim 1 wherein the concentrated sulfuric acid is cooled during passage between the stages.

7. A process according to claim 1 wherein sulfuric acid from the collecting tank is cooled and then recycled to the gas drying stage and at least one absorption stage.

8. A process according to claim 7 wherein sulfuric acid from the collecting tank is cooled and then recycled to both absorption stages.

9. In an apparatus for the production of sulfuric acid by the double absorption contact process comprising at least one tower containing sulfuric acid as absorbent for air- or gas-drying, a multistage catalytic reactor with connecting heat exchange means, an intermediate absorption tower disposed in series with said reactor before the last catalytic stage thereof and a final absorption tower, the improvement comprising: immersed overflow pipe means communicating the sump of said tower for air or gas drying with the intermediate absorption tower and immersed overflow pipe means communicating the sumps of the intermediate absorption tower and the final absorption tower with a collection tank means for sulfuric acid.

10. Apparatus according to claim 9 wherein the sumps of the intermediate absorption tower, the final absorption tower and the collecting tank are connected in series by said immersed overflow pipe means.

11. Apparatus according to claim 10 wherein the sump of final absorption tower acts as the collecting tank means for the acid product.

12. Apparatus according to claim 10 further comprising conduit means for adding water in communication with the intermediate absorption tower.

13. Apparatus according to claim 9 wherein at least one of the immersed overflow pipes comprises heat exchange means for cooling the acid in between the stages.

* * * * *